United States Patent Office 3,350,688
Patented Oct. 31, 1967

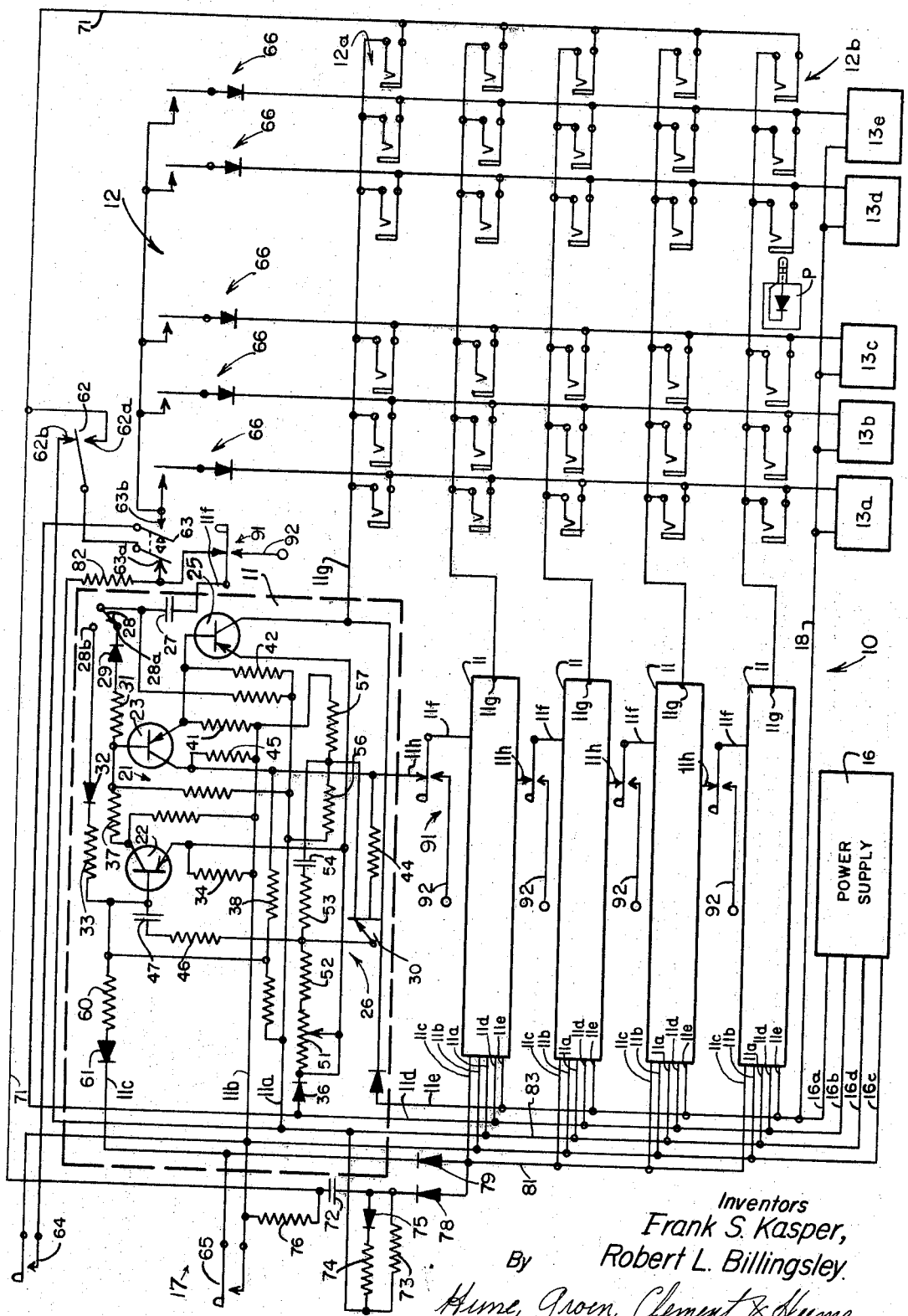

3,350,688
MATRIX CIRCUITRY CONTROLLED BY TIMING MODULES HAVING INDIVIDUAL TIME DURATION OUTPUTS
Frank S. Kasper, Hazel Crest, and Robert L. Billingsley, Elmhurst, Ill., assignors to Amtron, Inc., Midlothian, Ill., a corporation of Illinois
Filed Sept. 30, 1964, Ser. No. 400,322
9 Claims. (Cl. 340—166)

This invention relates to control circuits and more particularly to a timer control circuit for selectively actuating a plurality of output devices for discreet preselected periods in any desired sequence.

It is an object of the present invention to provide an improved control circuit for selectively actuating a plurality of output devices.

It is a further object of the present invention to provide a control circuit employing a plurality of selectively operable signal producing timing circuits that dictate the selective and versatile functioning of a plurality of output devices.

Still another object of the present invention is to provide a timer control circuit which utilizes a selectively actuable switching matrix for supplying the output from a number of individually adjustable timer modules to a plurality of output devices so that the operation of the output devices is selectively controlled in a reliable and efficient manner.

An additional object of the present invention is to provide a timer control circuit of the type outlined above, which control circuit is characterized by a relatively simple and low cost construction.

Other objects and advantages of the present invention will become apparent from the following detailed description of one preferred embodiment thereof, particularly when considered in conjunction with the accompanying drawing wherein the single figure is a schematic illustration of a preferred embodiment of a timer control circuit embodying the features of the present invention.

The present invention is directed to a timer control circuit that can be utilized to selectively control the operation of a plurality of output devices or components. A preferred embodiment of the timer control circuit comprises a plurality of selectively adjustable timer modules and a suitable switching matrix for supplying the output from the various timer modules to selected ones of a plurality of output devices or components. The timer modules are preferably solid state time control circuits which are selectively adjustable to produce an output of preselected duration in a highly reliable and efficient manner.

The illustrated embodiment of the control circuit is susceptible to several different modes of operation, thereby rendering the circuit extremely versatile. For example, the timer modules are selectively electrically interconnectable so that the modules can be actuated simultaneously or in a predetermined sequence. Alternatively, each timer module can be arranged to function independently of the operation of the other modules and in response to externally supplied triggering pulses. By employing a suitable switching matrix in conjunction with the individually adjustable timer modules which can be operated in any one of several operational modes, the versatility of the circuit is further enhanced.

Referring more specifically to the drawing, the single figure schematically illustrates a preferred embodiment of the timer control circuit of the present invention. The control circuit, which is generally designated by the numeral 10, preferably includes a plurality of timer modules 11 and a switching matrix 12 that is utilized to selectively supply the output from the timer modules to selected ones of a plurality of output devices 13a, 13b, 13c, 13d, and 13e. Although the illustrated embodiment of the control circuit is depicted as being comprised of five timing modules and a five-by-six switching matrix (i.e., one additional column of jacks being provided to implement the automatic recycling and resetting of the control circuit) that supplies the timer output to any of five output devices, it will be appreciated that any number of timer modules can be coupled with any appropriately sized switching matrix pursuant to the present invention.

As hereinafter more fully described, each of the timer modules 11 is preferably a solid state timing circuit employing transistorized bistable multivibrator and unijunction firing circuits that co-operatively function to produce an output signal of preselected duration which is selectively fed to any of the output devices 13a–13e through the switching matrix 12. The illustrated switching matrix 12 is a conventional plug and jack type unit wherein appropriate circuit connections are made between the output devices and the timer modules by the insertion of diode pin plugs P (only one of which is shown in the accompanying drawing) into appropriate ones of the jacks that comprise the matrix.

Preferably, a dual output power supply 16 (i.e., that produces both regulated and unregulated output voltages) is utilized with the timer control circuit 10, as is a starting and reset circuit 17. The circuit 17 both initiates the operation of the individual timer modules in a preselected sequence and is utilized to reset the timer control circuit when conditions so dictate.

Preferably, the power supply 16 feeds an unregulated negative potential (e.g. −24 v. Non-Reg.) to a pair of output conductors 16a and 16b, the latter of which is grounded. Correspondingly, this unit supplies a regulated negative potential (e.g. −24 v. Reg.) to a pair of conductors 16c and 16d, with the conductor 16d being grounded. The conductor 16a supplies the unregulated negative potential through a conductor 18 to one input terminal of each of the output devices 13a–13e, which, for example, might be control relays that dictate various functions of a multioperation machine. This negative input potential conditions each of the output devices 13a–13e for energization. Accordingly, and as hereinafter more fully described, when a selected one of the timing modules 11 is rendered effective to complete a circuit to the grounded conductor 16b, the appropriate one of the output devices is actuated. By utilizing a power supply having both regulated and unregulated outputs, the overall reliability and timing stability of the control circuit are enhanced since the output current necessary to actuate the devices 13a–13e is not drawn from the same supply which provides operating power for the solid state timer modules 11. That is, even though the output devices 13a–13e may have impedence characteristics which tend to effect voltage disturbances in the output from the power supply 16, such voltage variations do not affect the operation of the timing circuitry.

Each of the four timer modules 11 that are represented in block form corresponds to that which is schematically illustrated in detail and which has its output connected to the first (i.e., the uppermost) row 12a of matrix jacks or plug receptacles. In this connection, each of the timer modules 11 preferably employs a printed circuit board having eight terminal connections 11a, 11b, 11c, 11d, 11e, 11f, 11g and 11h.

The first two terminals 11a and 11b of each of the modules supply operating power to the solid state circuitry of the module from the conductors 16c and 16d (i.e., those whereto the regulated output voltage is supplied from the source 16). The terminal 11c is utilized as the reset input of the timer module. The terminal 11f serves as the trigger input for the timer module and the terminals 11g and 11h, respectively, provide the output that is utilized to actuate selected ones of the devices 13a–13e and the triggering signal that renders the next succeeding timer module effective when the timer modules are operated in a sequential mode.

Although a number of different timing modules employing a bistable multivibrator thatc ontrols the operation of a unijunction timing circuit can be utilized with the timer control 10 of the present invention, a solid state circuit utilizing a power amplifier to drive the external devices is preferable. In this connection, each of the timer modules 11 employs a bistable multivibrator circuit 21 that includes a pair of PNP transistors 22 and 23. The transistors 22 and 23 function in conjunction with a PNP transistor amplifier 25 and a unijunction timing circuit generally designated by the numeral 26 to supply output signals of controlled duration to the devices 13a–13e. That is, the output of each of the amplifiers 25 is produced for a period dictated by the associated unijunction timing circuit 26.

More particularly, the biasing potentials supplied to the circuits comprising each of the timer modules 11 results in the transistor 22 normally being in a conductive state. Correspondingly, the transistors 23 and 25 along with the unijunction transistor 30 are in a non-conductive state when the timer modules are in the normal or quiescent condition. However, when a triggering pulse is supplied to a timer module, the transistor 23 is rendered conductive, and the multivibrator circuit 21 changes state. When this occurs, the transistor 22 is rendered non-conductive and the amplifier 25 is biased into a conductive state to supply a grounding output signal that actuates selected ones of the output devices 13a–13e.

Upon termination of the timing cycle of the circuit 26, a signal is produced thereby to restore the transistor 22 to its normal conductive state and again render the transistors 23 and 25 non-conductive. When this occurs, the actuating signal for the external device is no longer produced by the amplifier 25 and the unijunction timing circuit is conditionad to carry out another timing function.

Referring more particularly to the specific module circuitry, a coupling capacitor 27 is connected between the trigger input terminal 11f of each timer module and a two-position switch 28. The switch 28 is utilized to selectively supply triggering pulses to the multivibrator circuit 21 and thereby effect alterations in the conductive state thereof. When the switch 28 is engaging the contacts 28a, as shown, the multivibrator responds to negative trigger pulses. In the alternate position (i.e., in engagement with the contact 28b), the switch completes a circuit to the multivibrator whereby positive trigger pulses effect desired variations in the conductive state thereof.

The contact 28a of the switch 28 is connected to the base on the transistor 23 through a semiconductor diode 29 and a resistor 31. Correspondingly, the contact 28b is connected to the base of the transistor 22 through a serially connected diode 32 and resistor 33. In addition to those associated with the trigger pulse input contacts, the multivibrator circuit 21, the associated amplifier circuit 25, and the unijunction timing circuit 26 employ a number of other resistors, diodes and capacitors that are electrically interconnected to insure efficient and reliable operation of each of the timer modules 11.

In this connection, biasing potential is supplied to the transistors 22 and 25 from the power supply 16 through a resistor 34 and a semiconductor diode 36. Biasing conditions for the emitter of the normally non-conductive transistor 23 are established by resistors 41 and 42 that are also connected to the output of the power supply 16. As shown, the collector of the transistor 22 is connected in the usual manner to the base of the transistor 23 through a coupling resistor 37. Similarly, the collector of the transistor 23 is connected to the base of the transistor 22 through a coupling resistor 38. The collector of the transistor 23 is connected to the base 2 of the unijunction transistor 30 in the timing circuit 26 through a temperature compensating resistor 44. The resistor 44 effects variations in the base 1 to base 2 potential of the transistor 30 so as to compensate for differences in the firing point of this unijunction transistor resulting from temperature changes.

The timing circuit 26, which controls the firing of the unijunction, includes a potentiometer 51, a resistor 52, a resistor 53, and a timing capacitor 54. The emitter of the unijunction transistor 30 is connected between the serially connected resistors 52 and 53. From this point the emitter of the unijunction is connected through a serially connected resistor 46 and a coupling capacitor 47 to the base of the transistor 22. The primary function of the resistor 53 in the timing circuit is to limit the amount of discharge current from the capacitor 54 after the unijunction transistor 30 has been triggered into a conductive state. A pair of resistors 56 and 57 are connected in the base 1 circuit of the unijunction transistor 30 to preclude the possibility of conduction of this transistor during the quiescent state of the timer module, which would otherwise result since there would be a small voltage drop across the resistor 45 and therefore a small positive bias across base 2 and base 1 of the transistor 30. More particularly, the resistors 56 and 57 are chosen so that base 1 tends to be slightly more positive than base 2 thereby preventing any low level free running of the unijunction circuit during the timer quiescent state.

Finally, a serially connected resistor 60 and semi-conductor diode 61 are connected between the base of the transistor 22 and the terminal 11c of the timer module. These serially connected components function to couple a resetting signal to the multivibrator circuit 21 in response to either a manual or automatic reset signal being supplied from the circuit 17.

Before considering the detailed operation of the timer modules 11, it is important to consider the manner in which the starting and reset circuit 17 cooperates with these modules to achieve the reliable and versatile operation which characterizes the timer control circuit of the present invention. In this connection, the circuit 17 includes a first selector switch 62 which is utilized to dictate whether the timer control functions manually or automatically. A second selector switch 63 is also employed to facilitate the testing of the devices 13a–13e. In addition, a manual start push button switch 64 and a manual reset push button switch 65 are provided by the circuit 17.

In the normal position of switch 62 (i.e., the position in which the switch is shown), the timer control circuit is rendered effective by actuating the manual start switch 64. In the alternate downward position, the switch 62 initiates the automatic operation of the timer control circuit 10 pursuant to the manner in which the switching matrix 12 is preconditioned by the insertion of plugs into various of the jacks which comprise the matrix.

The operate-test switch 63 provides means in the control circuit 10 for deviating from the normal operational mode thereof and for testing the devices 13a–13e by supplying a grounding signal directly to these devices from the power supply and through the conductor 16b. When in the test position (i.e., when in engagement with contact 63b), the switch 63 is serially connected to a plurality of parallelly connected push button switch and diode test circuits 66 so that selected ones of the output devices can be checked merely by actuating the corresponding push button switch. However, becaues the contactors of the switch 63 are ganged, accidental operation of one of the switches in the circuits 66 cannot cause the devices to be actuated when the switch 63 is in the "operate" position as shown.

The switch 65 provides for the manual resetting of the timer modules 11 by supplying the regulated output voltage from the power supply 16 to the reset input circuits associated with the terminals 11c. Automatic resetting of the timer modules is built into the circuit when operating in the automatic mode and is dictated by the position of the contact on the switch 62. More particularly, a conductor 71 connects each of the plug receptacles which form the last column 12b of the matrix to the normally open contact on the switch 62. In addition, the conductor 71 completes a circuit from the last column 12b of jacks to a two mode differentiating or pulse forming circuit comprised of a capacitor 72 and either a resistor 73 or the series combination of a resistor 74 and diode 75 that parallel the resistor 73.

A biasing resistor 76 is connected between one side of the capacitor 72 and the regulated voltage output conductor 16c of the power supply 16, which also is connected to the stationary contact of the manual reset switch 65. The other side of the capacitor 72 is connected through a diode 78 of a diode "OR" circuit 78 and 79 and to a conductor 81 that serves as the common input to each of the reset input terminals 11c of all of the modules 11 with the exception of the first module. The other diode 79 is connected from the conductor 81 to the movable contact on the reset switch 65 as well as to the reset input termnal 11c of the first of the timer modules 11.

The starting and reset circuit 17 is completed by a resistor 82 that is connected between the contact 63a of the selector switch 63 and a conductor 83 that is connected to the grounded output 16d of the power supply 16. This resistor 82 provides a discharge path for the coupling capacitor 27 at the input to the first of the timer modules 11.

Referring now to the overall operation of the control circuit 10, the normal output of each of the timer modules as derived from the collector of the transistor 25 is a negative potential. However, when the multivibrator circuit 21 is rendered effective to change conductive states and thereby trigger the power amplifier 25 into conduction, the output supplied to the terminal 11g is a grounding signal. The grounding signal causes selected ones of the devices 13a–13e to be rendered effective in accordance with the switching arrangement set up in the switching matrix 12 and for a time interval dictated by the unijunction timing circuit 26.

When the control circuit is operating in the automatic state, the placement of a diode pin plug P in one of the plug receptacles comprising the last column 12b of the matrix 12 conditions the control circuit for recycling after the timers prior to and associated with that receptacle have run through their respective timing cycles. Considering the overall operation of the circuit in greater detail and assuming that the last (i.e., bottom-most) receptacle of the column 12b is provided with a diode pin plug, the operation of the control circuit is initiated when the selector switch 62 is shifted to the automatic position (i.e., in engagement with the contact 62a). When this occurs and because the output of 11g of the last timer module is not grounded, the negative supply voltage is fed through the resistor 76, the contact 62a, the contact 63a the contactor of a switch 91, and the terminal 11f of the first timer module 11. This negative voltage is fed to the base of the transistor 23 thereby causing this PNP transistor to be rendered conductive and the transistor 22 to be cut off. As the multivibrator circuit 21 is thus triggered into the alternate conductive state, the power amplifier 25 is rendered conductive as a result of the flow of emitter current through the resistor 42 and the voltage developed thereacross. Upon being rendered conductive, the amplifier 25 produces a grounding output signal at the collector thereof that is supplied to the output terminal 11g.

The negative voltage that is fed to the input terminal 11f of the first timer module 11 is also fed through the pulse forming network formed by the capacitor 72 and resistor 73, the parallel resistor-diode combination 74-75 responding only to positive pulses and offering a substantially smaller time constant for the differentiating circuit to insure that such positive pulses do not inhibit the reliable operation of the control circuit 10. The output from the pulse forming network is fed through the diode 78 so as to reset each of the other timer modules 11. However, the diode 79 precludes this reset signal from being transmitted to the first of the modules 11.

It will be appreciated that conduction of the amplifier 25 is accompanied by the concomitant build up of charge on the timing capacitor 54. That is, the capacitor 54 charges through the resistors 51, 52 and 53 and continues to charge for a period dictated by the setting on the potentiometer 51, at which time the firing voltage for the unijunction transistor 30 is attained.

After the unijunction circuit 26 has timed out, a negative pulse is produced at the emitter of the transistor 30, and this pulse is fed to the base of the transistor 22 through the series coupling network formed by the resistor 46 and capacitor 47. Consequently, the transistor 22 is rendered conductive, the transistors 23 and 25 are returned to the normally nonconductive state, and the grounding output signal is no longer produced at the output terminal 11g. Upon being again rendered non-conductive, the transistor 23 has a negative voltage produced at the collector thereof which is supplied to the terminal 11h. This voltage is used to trigger the second of the timer modules when the timer control circuit is operated in a sequential mode, the operation of the second timer module corresponding to that of the first module as just described and having an operational period dictated by the setting of the potentiometer employed in this circuit.

The versatility of the control circuit 10 allows the output devices 13a–13e to be automatically actuated in any desired sequence. In addition, the circuit 10 can be operated manually in response to the selective actuation of the manual start and reset switches 64-65. The present invention also contemplates that the timer control 10 be susceptible to actuation from suitable external devices that may or may not be associated with the output devices (e.g. responsive to the termination of a function performed by such devices). To this end, each of the trigger input terminals 11f of each of the timer modules 11 is connected to a conventional two position selector switch 91.

On the second and succeeding timer modules 11, the switch 91 is normally maintained in electrical contact with the output terminal 11h of the preceding timer module but can be selectively switched into electrical contact with an input lead 92. The switch 91 associated with the first timer module normally engages the operate contact 63a of the operate-test switch 63 but can also be selectively switched into contact with an input lead 92. Preferably, the input lead 92 is connected to supply a feedback signal to a selected one of the modules upon completion of an operation effected by one or more of the output devices 13a–13e or the completion of an opeartion of means controlled by one or more of the output devices.

From the foregoing description, it will be appreciated that the control circuit of the present invention is susceptible to a number of different modes of operation without requiring costly and complex circuit modifications and/or numerous adjustments in the operating characteristics of the timer modules 11. In this connection, it should be understood that each of the modules 11 can be triggered into operation from either a positive or negative pulse source as dictated by the position of the selector switch 28 employed in each module. Moreover, the control circuit 10 is susceptible to manual operation or automatic operation. When functioning in an automatic state, the control circuit can be recycled pursuant to the placement of diode pin plugs in an appropriate one of the plug receptacles which comprise the last column 12b of the switching matrix 12. By the selective positioning of the switches 28 and/or 91 the timer modules of the control circuit can be operated in sequence, and/or simultaneously either in response to signals from the preceding module or in response to feedback signals supplied to the modules from an external source. This versatility of the control circuit 10 is further enhanced in that each of the timer modules is preferably a transistorized printed circuit which can be conditioned to operate for any preselected period of time in response to a triggering signal independent of the periods of operation set up for the other modules employed in the control circuit.

Those skilled in the art will appreciate that the foregoing description of the control circuit 10 is merely illustrative of one preferred embodiment of the circuit. In this connection, it will be appreciated that the plug and jack type switching matrix is not the only type of switching scheme that can be utilized with the control circuit and that the generic term "switching matrix" contemplates cross-bar switching arrangements and electromagnetic coupling arrangements having multiple rows and columns in addition to the type of matrix specifically illustrated in the accompanying drawing. When employing such other forms of switching arrangements in conjunction with the aforedescribed timer modules, it will of course be necessary to provide means to preclude improper feedback from the switching network to the various modules. In the illustrated embodiment, "diode action" is relied upon to prevent such improper feedback; however, in another form of switching matrix the equivalent of the diode pin plugs would obviously be employed. Other similar variations in the make up of the major components comprising the control circuit might also be devised without departing from the invention as defined in terms of varying breadth in the accompanying claims.

What is claimed is:

1. A circuit for controlling the selective operation of a plurality of output devices which circuit comprises a switching matrix including means for establishing a selectively variable switching condition within said switching matrix, a plurality of individually adjustable timer modules for producing output signals of preselected duration, the output of each of said timer modules being connected to said switching matrix so that the operation of selected ones of said output devices is controlled by said timer modules in accordance with the preestablished switching condition of said switching matrix, and circuit means interconnecting said switching matrix and said timer modules so that said timer modules can be actuated individually or automatically in sequence, simultaneously and/or independently in response to external signals.

2. A circuit for controlling the selective operation of a plurality of output devices which circuit comprises a plurality of individually adjustable timer modules, a multi-element switching matrix including means for establishing a selectively variable switching condition within said matrix, said switching condition establishing means including means for simultaneously coupling the output of each of said timer modules to one each of the output devices and the output of one each of said timer modules to selected one of the output devices, and a starting and reset circuit electrically inter-connected with said timer modules for selectively effecting the actuation of said timer modules individually or automatically in sequence, simultaneously and/or independently in response to external signals.

3. A control circuit for selectively operating a plurality of output devices in sequence and/or partially or wholly in simultaneous fashion, which control circuit comprises a plurality of individually adjustable solid state timer modules, a switching matrix including means for selectively establishing a switching condition within said switching matrix, said switching condition establishing means including a plurality of switching elements with first groups of said switching elements being selectively connectable to the output of one each of said timer modules and the input to each of the output devices and with second groups of said switching elements being selectively connectable to the output of each of said timer modules and to the input of one each of said output devices, and selectively actuable circuit means electrically interconnecting said switching matrix and said timer modules so that said timer modules can be operated individually or automatically in sequence, simultaneously and/or in response to external signals.

4. In a circuit for controlling the selective operation of a plurality of output devices by supplying signals through a switching matrix that includes means for establishing a selectively variable switching condition within said matrix, a plurality of individually adjustable timer modules connected to said switching matrix so that the operation of selected ones of said output devices is controlled by output signals derived from said timer modules in response to the preestablished switching condition of said switching matrix; each of said timer modules comprising a bistable multivibrator circuit having normal and alternate conductive states, a power amplifier circuit connected to the output of said multivibrator circuit and a selectively vibrator circuit changes from the normal to the alternate multivibrator circuit; said power amplifier circuit supplying an output signal from said timer module when said multivibrator circuit changes from the normal to the alternate conductive state; said timing circuit responding to said multivibrator circuit changing conductive states so as to initiate a preselected timing cycle and producing an output signal upon the termination of said timing cycle; said multivibrator circuit responding to the output signal from said timing circuit upon termination of said timing cycle so that said multivibrator is returned to the normal conductive state and the output signal from said amplifier circuit is cutoff.

5. A circuit for controlling the selective operation of a plurality of output devices; which circuit comprises a plurality of individually adjustable timer modules; each of said timer modules comprising a bistable multivibrator circuit having normal and alternate conductive states, a power amplifier circuit connected to the output of said multivibrator circuit, and a selectively variable timing circuit electrically interconnected with said multivibrator circuit; said power amplifer circuit supplying an output signal from said timer module when said multivibrator circuit changes from the normal to the alternate conductive state; said timing circuit responding to said multivibrator circuit changing conductive states so as to initiate a preselected timing cycle and producing an output signal upon the termination of said timing cycle; said multivibrator circuit responding to the output signal from said timing circuit upon termination of said timing cycle so that said multivibrator is returned to the normal conductive state and the output signal from said amplifier circuit is cutoff; a multi-element switching matrix including means for establishing a selectively variable switching condition within said matrix; said switching condition establishing means including means for simultaneously coupling the output of each of said timer modules to one each of the output devices and the output of one each of said timer modules to selected one of the output devices; and selectively actuable circuit means selectively interconnecting said switching matrix and said timer modules; said selectively actuable circuit means including switching means for initiating the automatic operation of a first of said timer modules and for simultaneously conditioning the remaining ones of said timer modules for sequential operation or individual operaton in response to externally supplied signals.

6. A timing module for use in a control circuit that selectively effects the control of a plurality of output devices by supplying the outputs of a plurality of said timing modules through a multi-element switching matrix in accordance with a switching condition that is preestablished in said matrix and in response to the actuation of starting and reset circuitry that is electrically interconnected with said timing modules and said switching matrix; which timing module comprises a bistable multivibrator circuit having normal and alternate conductive states; a power amplifier circuit connected to the output of said multivibrator circuit and a selectively variable timing circuit electrically interconnected with said multivibrator circuit; said power amplifier circuit supplying an output signal from said timer module when said multivibrator circuit changes from the normal to the alternate conductive state; said timing circuit responding to said multivibrator circuit changing conductive states so as to initiate a preselected timing cycle and producing an output signal upon the termination of said timing cycle; said multivibrator circuit responding to the output signal from said timing circuit upon the termination of said timing cycle so that said multivibrator is returned to the normal conductive state and the output signal from said amplifier circuit is cutoff.

7. In a circuit for controlling the selective operation of a plurality of output devices by supplying signals through a switching matrix that includes means for establishing a selectively variable switching condition within said matrix, a plurality of individually adjustable timer modules connected to said switching matrix so that the operation of selected ones of said output devices is controlled by output signals derived from said timer modules in response to the preestablished switching condition of said switching matrix, each of said timer modules including a solid state bistable multivibrator circuit including a first normally conductive transistor and a second normally non-conductive transistor, a solid state power amplifier circuit connected to the output of said multivibrator circuit, and a unijunction transistor timing circuit electrically interconnected with said first and second transistors of said multivibrator circuit, said power amplifier circuit supplying an output signal from said timer module when said multivibrator circuit changes conductive states and said second normally non-conductive transistor is rendered conductive, said unijunction transistor timing circuit responding to said second transistor being rendered conductive to initiate a preestablished timing cycle and producing an output signal upon the termination of said timing cycle, said multivibrator circuit responding to the output signal produced by said unijunction transistor circuit upon termination of said timing cycle so that said first transistor is returned to the normally conductive state and the output signal from said power amplifier circuit is cutoff.

8. A control circuit for selectively operating a plurality of output devices in sequence and/or partially or wholly in simultaneous fashion; which control circuit comprises a plurality of individually adjustable solid state timer modules; each of said timer modules including a solid state bistable multivibrator circuit including a first normally conductive transistor and a second normally non-conductive transistor, a solid state power amplifier circuit connected to the output of said multivibrator circuit, and a unijunction transistor timing circuit electrically interconnected with said first and second transistors of said multivibrator circuit, said power amplifier circuit supplying an output signal from said timer module when said multivibrator circuit changes conductive states and said second normally non-conductive transistor is rendered conductive, said unijunction transistor timing circuit responding to said second transistor being rendered conductive to initiate a preestablished timing cycle and producing an output signal upon the termination of said timing cycle, said multivibrator circuit responding to the output signal produced by said unijunction transistor circuit upon termination of said timing cycle so that said first transistor is returned to the normally conductive state and the output signal from said power amplifier circuit is cutoff; a switching matrix including means for selectively establishing a switching condition within said switching matrix; said switching condition establishing means including a plurality of switching elements with first groups of said switching elements being selectively connectable to the output of one each of said timer modules and the input to each of the output devices and with second groups of said switching elements being selectively connectable to the output of each of said timer modules and to the input of one each of said output devices; selectively actuable circuit means selectively interconnecting said switching matrix and said timer modules, said selectively actuable circuit means including switching means for initiating the automatic operation of a first of said timer modules and for simultaneously conditioning the remaining ones of said timer modules for sequential operation or individual operation in response to externally supplied signals.

9. A timing module for use in a control circuit that selectively effects the control of a plurality of output devices by supplying the outputs of a plurality of said timing modules through a multielement switching matrix in accordance with a switching condition that is preestablished in said matrix and in response to the actuation of starting and reset circuitry that is electrically interconnected with said timing modules and said switching matrix, which timing module comprises a bistable multivibrator circuit including a first normally conductive transistor and a second normally non-conductive transistor, a solid state power amplifier circuit connected to the output of said multivibrator circuit, and a unijunction transistor timing circuit electrically interconnected with said first and second transistors of said multivibrator circuit, said power amplifier circuit supplying an output signal from said timer module when said multivibrator circuit changes conductive states and said second normally non-conductive transistor is rendered conductive, said unijunction transistor timing circuit responding to said second transistor being rendered conductive to initiate a preestablished timing cycle and producing an output signal upon the termination of said timing cycle, said multivibrator circuit responding to the output signal produced by said unijunction transistor circuit upon termination of said timing cycle so that said first transistor is returned to the normally conductive state and the output signal from said power amplifier circuit is cutoff.

No references cited.

NEIL C. READ, *Primary Examiner.*

H. PITTS, *Assistant Examiner.*

UNITED STATES PATENT OFFICE
CERTIFICATE OF CORRECTION

Patent No. 3,350,688                          October 31, 1967

Frank S. Kasper et al.

It is hereby certified that error appears in the above numbered patent requiring correction and that the said Letters Patent should read as corrected below.

Column 3, line 7, for "thatc ontrols" read -- that controls --; line 40, for "conditionad" read -- conditioned --; line 47, for "contacts" read -- contact --; column 4, line 68, for "becaues" read -- because --; column 5, line 24, for "termnal" read -- terminal --; column 6, line 57, for "opeartion" read -- operation --; column 7, line 59, for "one" read -- ones --; column 8, line 22, for "vibrator circuit changes from the normal to the alter-" read -- variable timing circuit electrically interconnected with --; line 58, for "couplng" read -- coupling --; line 60, for "one" read -- ones --.

Signed and sealed this 3rd day of December 1968.

(SEAL)
Attest:

EDWARD M. FLETCHER, JR.                       EDWARD J. BRENNER
Attesting Officer                               Commissioner of Patents